US010732493B2

(12) United States Patent
Kong (10) Patent No.: US 10,732,493 B2
(45) Date of Patent: Aug. 4, 2020

(54) IMMERSIVE ALL-IN-ONE PC SYSTEM (71) Applicant: Liang Kong, Huzhou (CN)

(72) Inventor: Liang Kong, Huzhou (CN)

(*) Notice: Subject to any disclaimer, the term of this patent is extended or adjusted under 35 U.S.C. 154(b) by 21 days.

(21) Appl. No.: 15/770,871

(22) PCT Filed: Sep. 30, 2016

(86) PCT No.: PCT/CN2016/101103
§ 371 (c)(1),
(2) Date: Apr. 25, 2018

(87) PCT Pub. No.: WO2017/071454
PCT Pub. Date: May 4, 2017

(65) Prior Publication Data
US 2019/0056644 A1 Feb. 21, 2019

(30) Foreign Application Priority Data

Oct. 26, 2015 (GB) .................................. 1518878.2
Aug. 31, 2016 (CN) .......................... 2016 1 0794983

(51) Int. Cl.
G03B 21/10 (2006.01)
G03B 37/00 (2006.01)
(Continued)

(52) U.S. Cl.
CPC ............. *G03B 21/10* (2013.01); *G03B 37/00* (2013.01); *G06F 3/011* (2013.01); *G06F 3/017* (2013.01); *G06F 3/147* (2013.01); *G09G 3/002* (2013.01); *G09G 3/003* (2013.01); *G09G 5/026* (2013.01); *G09G 5/377* (2013.01); *H04N 9/3147* (2013.01);
(Continued)

(58) Field of Classification Search
CPC .... G03B 21/10; G03B 2206/00; G03B 37/00; G06F 2203/012; G06F 3/011; G06F 3/017; G06F 3/147; G09G 2354/00; G09G 2370/16; G09G 3/002; G09G 3/003;
(Continued)

(56) References Cited

U.S. PATENT DOCUMENTS

2002/0124479 A1* 9/2002 Branc ................. G09F 15/0068
52/36.1
2009/0100767 A1* 4/2009 Kondo ................... G03B 21/10
52/6

(Continued)

FOREIGN PATENT DOCUMENTS

CN 203412320 1/2014
CN 104035268 9/2014

Primary Examiner — Viet D Pham
(74) Attorney, Agent, or Firm — Miller Law Group, PLLC (57) ABSTRACT An immersive all-in-one PC system includes a housing having an outer wall, in inner wall connected to the outer wall, and a cavity between the outer and inner walls. The inner wall has one or more surfaces defining a chamber within the housing. The housing includes at least one entranceway bridging the outer and inner walls for a person to enter and exit the chamber. A projector screen is disposed internally of the outer wall and arranged to project images onto the chamber side of the inner wall for providing an immersive viewing experience to a person situated inside the chamber. A computer system is disposed at least partially within the cavity with the computer system being connected to the projector system for controlling the projected images.

20 Claims, 10 Drawing Sheets (51) Int. Cl.
 *G06F 3/01* (2006.01)
 *H04N 9/31* (2006.01)
 *G06F 3/147* (2006.01)
 *G09G 5/02* (2006.01)
 *G09G 3/00* (2006.01)
 *G09G 5/377* (2006.01)

(52) U.S. Cl.
 CPC ....... *H04N 9/3194* (2013.01); *G03B 2206/00* (2013.01); *G06F 2203/012* (2013.01); *G09G 2354/00* (2013.01); *G09G 2370/16* (2013.01)

(58) Field of Classification Search
 CPC ...... G09G 5/026; G09G 5/377; H04N 9/3147; H04N 9/3194
 See application file for complete search history.

(56) References Cited

U.S. PATENT DOCUMENTS

| | | | |
|---|---|---|---|
| 2010/0263802 A1 | 10/2010 | Juan et al. | |
| 2012/0146902 A1* | 6/2012 | Adermann | G06T 7/20 345/158 |
| 2012/0223885 A1* | 9/2012 | Perez | G06F 3/011 345/158 |
| 2013/0144629 A1* | 6/2013 | Johnston | G06F 3/167 704/275 |
| 2014/0368428 A1* | 12/2014 | Pinault | A63F 13/06 345/156 |
| 2016/0239092 A1* | 8/2016 | Junuzovic | G02B 6/04 |

\* cited by examiner

IMMERSIVE ALL-IN-ONE PC SYSTEM

TECHNICAL FIELD

The present invention relates to an immersive all-in-one PC system.

BACKGROUND ART

Display screen technology has advanced over the last few decades, with CRT (cathode ray tube) displays being superseded by LCDs (liquid crystal displays), amongst others, allowing the thickness of televisions and computer monitors to be significantly reduced, giving rise to 'flat screens'. Flat screens often contain rare earth elements (lanthanides) for their luminescent properties. More recently, the average display size of electronic screens has increased substantially, with modern computer monitors around 30 inches (76 cm) across and modern televisions around 55 inches (140 cm) across.

However, the increased affordability of large electronic screens has contributed to an increased amount of obsolete electronic screens as waste. If not re-purposed, these often end up in landfill because they can be difficult to recycle. At the same time, lanthanides are becoming increasingly expensive and difficult to obtain due to limited mineral resources, meaning that very large electronic screens will be too expensive for most consumers in the near term.

One alternative to a large electronic display is a CAVE (Cave Automatic Virtual Environment)—a type of immersive virtual reality environment used for viewing 3D images. A typical CAVE is a room-sized cuboid, constructed within a larger room, with projectors situated outside the walls of the CAVE to project images onto those walls via rear projection. This mitigates the problem of shadows being cast on the walls by a person moving close to the CAVE walls. Multiple people can use a CAVE at the same time. Bespoke 3D glasses must be worn in order to experience the images as 3D.

However, CAVEs have not been widely adopted for several reasons. First, a large amount of space is required outside a CAVE in order to properly set up its projectors, and most consumers do not have a room of sufficient size at home to accommodate this. A CAVE is also difficult to assemble due to the numerous projectors, screens and cables (which are often a trip-hazard), and is not designed for quick set-up or removal. In other words, a room generally has to be purposefully designated for the use of a CAVE, rather than temporarily accommodating one. Furthermore, expensive custom software is needed to operate a CAVE, and the fact that the images are projected from the exterior of the walls results in reduced image contrast and clarity.

DISCLOSURE OF THE INVENTION

An object of the present invention is to reduce or substantially obviate the aforementioned problems.

According to the present invention, there is provided an immersive all-in-one PC system comprising a housing including an outer wall, an inner wall connected to the outer wall, and a cavity between the outer and inner walls, the inner wall having one or more surfaces defining a chamber within the housing, the housing including at least one entranceway bridging the outer and inner walls for a person to enter and exit the chamber, a projector system disposed internally of the outer wall and arranged to project images onto the chamber side of the inner wall for providing an immersive viewing experience to a person situated inside the chamber, and a computer system disposed at least partially within the cavity, the computer system being connected to the projector system for controlling the projected images.

Advantageously, the immersive all-in-one PC system is self-contained and does not require the end user to substantially construct or assemble the component parts prior to use; and incorporating the computer system partly into the cavity also contributes to this. The inner wall functions as a very large screen for displaying images from the projector system, immersing the user in the images displayed to a much greater extent than commonly available TVs and monitors without the need for a large LCD display, for example. The projector system is positioned inside the housing, hence the size of the immersive all-in-one PC system is limited to the dimensions of the outer wall. The area required for the immersive all-in-one PC system is therefore predetermined, and the space required can be minimised with these dimensions in mind. Projecting images onto the chamber side of the inner wall (i.e. the inwardly-facing surface of the inner wall) is advantageous because increased image contrast and clarity is achieved when compared to back-projection.

The inner wall may include a support structure in an upper region of the housing. The projector system may be supported by the support structure. The projector system is therefore overhead and does not substantially obstruct the view of the inner wall for a person within the chamber.

The support structure may be a shelf. The projector system may be arranged on the shelf to project images outwardly therefrom. Preferably, the inner wall includes a substantially vertical screen, and the projector system is arranged to project images from the shelf to the screen.

At least one additional screen may be provided within the chamber, which may be interposed between the substantially vertical screen and the projector system. This enables images to be projected onto different screens, giving a foreground, a background, and potentially one or more mid-grounds, which enhances the immersive experience.

The shelf may include a distal edge. The projector system may face over the distal edge for projecting images onto the screen. The projector system may include two or more projectors, at least one of which may be mounted facing over the distal edge.

Part of the projector system may face the shelf. In this case, the shelf may be adapted to allow substantial passage of the projected images therethrough, which may enable the projector system to project images onto the ground within the housing. Having images projected onto the floor of the housing, or the ground enclosed within the housing (for embodiments where the housing does not include a floor), enhances the immersive experience. The shelf does not substantially interact with the projected images, and so does not affect the quality of the projected images.

The shelf may include one or more apertures or light-transmitting portions (for example, glass or plastic windows) aligned with the projector system.

The projector system may point away from one side of the housing and towards another side of the housing. The projector system may point from an inner region of the housing towards an outer region of the housing. The projector system may be at least partially mounted within the cavity.

This means that images projected by the projector system originate from points close to the inner wall. Thus, compared to a projector system projecting images from a relatively central position in the chamber, a person must closely approach the inner wall before casting a shadow by blocking the projected image(s). Having the projector system partly within the cavity also reduces the extent to which the system protrudes into the chamber, maximising the space available for moving around.

The computer system may be wholly disposed within the cavity. This can provide more space in the chamber for movement, and can enable a wider entranceway to be used.

Support wheels may be provided underneath the housing. Preferably, the support wheels are omnidirectional. More preferably, the support wheels include brakes that can be applied for preventing wheel rotation. Yet more preferably, the support wheels are mounted substantially within and protrude minimally from the cavity of the housing.

The wheels enable the immersive all-in-one PC system to be easily moved from one location to another without dismantling and reassembling it, which would be very time-consuming. Using omnidirectional wheels enables unrestricted motion in any direction, whilst the brakes can be applied to ensure that the immersive all-in-one PC system does not roll out of position of its own accord. In embodiments where the immersive all-in-one PC system does not include a floor, integrating the wheels into the housing means that the housing is only raised from the ground by the wheels to a minimal extent. This in turn means that image(s) displayed on a full wall in the chamber appear to meet the ground relatively seamlessly.

Surfaces of the inner wall may include at least one metallic surface. Surfaces of the inner wall may include at least one curved surface.

Metallic surfaces are particularly effective as screens for the projected image(s). Smoother surfaces may be more effective in this regard, as the reflected light from the projector system will be less diffuse. Curved surfaces can extend around a person within the chamber, contributing to a more immersive experience than a flat screen.

The housing may extend around a viewing region of the chamber by substantially at least 180°. Preferably, the housing extends the housing extends around the viewing region of the chamber by substantially 360°. More preferably, the projector system may project images onto the ground within the housing.

For a person within the chamber, the area of the image(s) displayed fills most of their field of vision, contributing to a more immersive experience. A 360° immersive all-in-one PC system is even more immersive, completely filling the person's field of view and allowing them to see different parts of a panoramic image, for example, by turning around. Projecting images onto the ground further enhances immersion in (and the realism of) a projected scene.

Cabling may connect the computer system and projector system together. The cabling is preferably at least partly disposed within the cavity of the housing.

By putting cables within the cavity, the immersive all-in-one PC system does not have any cabling trailing across the floor. Therefore, there is no possibility of tripping over the cabling. It is also advantageous to integrate the cabling into the cavity because the inner wall remains a smooth continuous surface uninterrupted by cables.

The projector system may include multiple projectors. The computer system may include an image fusion processor connected to the projectors. The processor may enable the projectors to project image components which are combined on the inner wall.

Using multiple projectors facilitates the creation of a larger display (i.e. larger images) whilst maintaining a high resolution image. It also enables the projector system to display different images (i.e. image components) in different directions. These separate images can be correctly combined (or fused) by the image fusion processor to provide a single seamless image or video, enhancing the immersive experience.

The housing may include a camera system connected to the computer system for tracking a person within the chamber. Preferably, the computer system adjusts the projected images to substantially correspond to the position of a person within the chamber captured by the camera system. More preferably, the computer system is controllable by the person via specific motions captured by the camera system.

The camera system feeds information back to the computer system, enabling the projected images to be continuously or periodically adjusted relative to the position and/or movement of a person in the chamber. This enables a change of apparent perspective depending on whether the person is standing or sitting, for example, and on their relative location within the chamber. The camera system also enables remote control of the computer system where specific actions, motions or gestures correspond to specific commands. For example, walking out of the chamber could trigger the computer system to shut down or sleep.

The housing may include a speaker system connected to the computer system. The speaker system may be adapted to selectively emit sound from one or more directions which may correspond to the location(s) of one or more of the projected images displayed on the inner wall.

This mimics a real situation by generating surround sound, where sounds originate from different places depending on the person or event that triggers the sound. Hence, the immersive all-in-one PC system provides a more realistic and immersive experience by synchronising the timing and apparent origin of sounds with the projected image(s). Emitted sounds also 'move' or track with an image of a person/object moving across the screen for improved realism, being most effective for a 360° immersive all-in-one PC system.

Either or both of the inner and outer walls may include at least one access panel for allowing access to the cavity. This enables maintenance and repair of the cabling and other components located within the cavity, as well as allowing for initial installation and upgrades, if needed.

Apertures may be provided in either or both of the inner and outer walls. Some apertures may be provided as vents to cool the computer system, for example. Other apertures may be provided to allow peripherals to be connected to the computer system (e.g. a USB drive), to allow switches or buttons on the computer system to be pressed, and/or to allow wireless transmission of commands to and from another device, e.g. a tablet.

Entranceways into the chamber may include one or more doors. Alternatively, the entranceways may include one or more archways. In the case of a 360° immersive all-in-one PC system especially, doors are preferred over archways to enhance the immersive experience. Archways allow for quick entry into and exit from the chamber, and also allow people outside the chamber to see into the immersive all-in-one PC system.

The outer wall may be substantially opaque. This prevents ambient light from interfering with the image(s) displayed within the chamber. In other words, the outer wall substantially prevents light external to the immersive all-in-one PC system from entering the chamber, maintaining the image quality of the projected images on the inner wall.

BRIEF DESCRIPTION OF DRAWINGS

For a better understanding of the present invention, and to show more clearly how it may be carried into effect, reference will now be made by way of example only to the accompanying drawings, in which.

DETAILED DESCRIPTION OF EMBODIMENTS

Figure 1A:
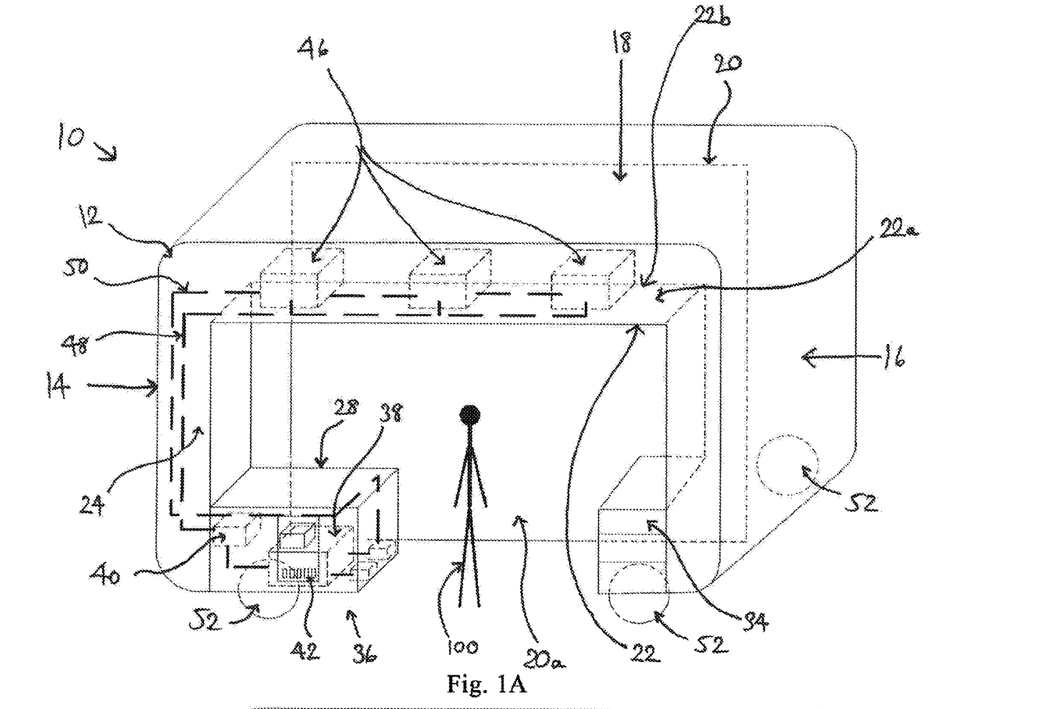
FIG. 1A shows a front perspective view of a first embodiment of an immersive all-in-one PC system (with selected internal components indicated) of the present invention.
Figure 1B:
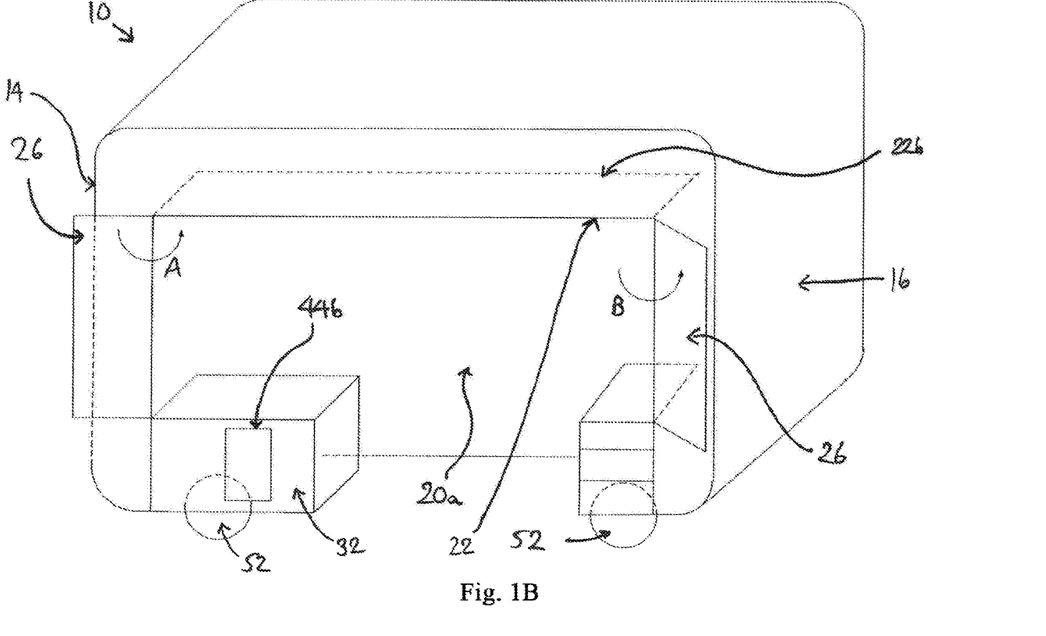
FIG. 1B shows a front perspective view of the immersive all-in-one PC system of FIG. 1A, indicating access panels.
Figure 1C:
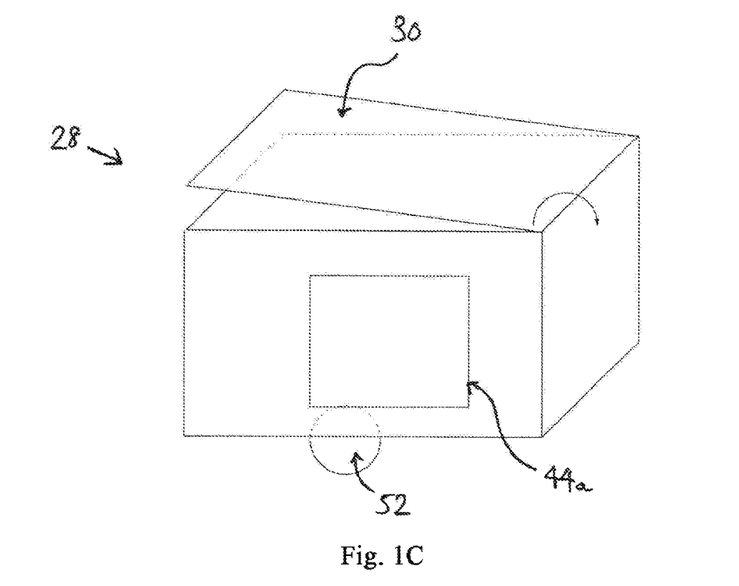
FIG. 1C shows a front perspective view of a casing of the immersive all-in-one PC system of FIG. 1A in isolation.

Referring firstly to FIGS. 1A to 1C, a first embodiment of an immersive all-in-one PC system is indicated generally at 10. The immersive all-in-one PC system 10 includes a housing 12 which has an outer wall, an inner wall, and a cavity 24 between the outer and inner walls. The outer and inner walls include two sidewalls 14, 16, a top wall 18, and a rear wall 20 which are connected together. The sidewalls 14, 16 and top wall 18 form a front archway 22 opposite the rear wall 20, allowing the person 100 to enter the immersive all-in-one PC system 10. External edges and apices where the walls 14, 16, 18, 20 and archway 22 meet one another are rounded. In some embodiments, the housing 12 may be assembled from two separate halves, for ease of delivery. The housing 12 could be divided into several parts for assembly for the same reason.

The inner wall defines a chamber within the housing 12. A person 100 is shown standing at the edge of the chamber for reference. The outer wall is substantially opaque to minimise the extent to which external (ambient) light enters the chamber. Inside the chamber, the rear wall 20 includes a metallic screen 20a. The screen 20a is smooth and flat to reflect incident light uniformly.

A shelf 22a is provided within the housing 12. The shelf 22a extends into the chamber away from the entranceway 22. The shelf 22a is substantially horizontal. The shelf 22a is provided behind the front archway 22, opposite the rear wall 20. The inner wall includes access panels 26 that can be opened to expose the cavity 24, indicated by the arrows A, B. The shelf 22a includes a free edge 22b. The free edge 22b is the part of the shelf 22a furthest from the archway 22, closest to the screen 20a in this embodiment.

The housing 12 includes a casing 28. The casing 28 extends from the inner and outer walls across the archway 22. The casing 28 includes a hollow portion that forms part of the cavity 24. The casing 28 includes a hinged lid 30 that permits access inside the casing 28 (as indicated in FIG. 1C). The casing 28 also includes a hinged front panel 32 that opens outwardly. The housing 12 further includes a set of drawers 34 for storage. The drawers 34 also extend from the inner and outer walls across the archway 22, opposite the casing 28. Either or both of the casing 28 and drawers 34 may be used as stands for additional devices.

The casing 28 contains a computer system, indicated generally at 36. The computer system 36 includes a computer 38 and an image fusion processor 40. Alternative embodiments of the computer system 36 may include other components or peripherals, including but not limited to: wireless receivers, transmitters and/or transceivers; speakers; a modem; and a router.

Various sockets and buttons 42 are provided in the computer 38, respectively for connection of peripherals such as a USB drive and for turning the computer 38 on and off, for example. Apertures 44a, 44b are provided through opposing sides of the casing 28, facing into and away from the chamber respectively. The computer 38 is aligned so that its sockets and buttons 42 generally face towards either of the apertures 44a, 44b for ease of use. The apertures 44a, 44b thus enable access to the computer 38 without needing to open the lid 30, as well as acting as vents to allow air circulation. The inward-facing aperture 44a (FIG. 1C) is larger than the outward-facing aperture 44b (FIG. 1B) in this embodiment.

A projector system is mounted to the inner wall near the top of the chamber. In this embodiment, the projector system includes three projectors 46 disposed on the shelf 22a behind the front archway 22, substantially hiding them from view. The three projectors 46 are spaced apart in a line. One of the projectors 46 is provided centrally on the shelf 22a. The other two projectors 46 are displaced to either side of the central projector 46 by substantially similar distances. Each projector 46 is oriented towards and substantially perpendicular to the screen 20a, being located on one side of the housing 12 and facing across toward the other side of the housing 12. Each projector 46 is aligned with and faces across the free edge 22b of the shelf to reduce the throw distance to the screen 20a. This reduces the likelihood of a person blocking the projected images from reaching the screen 20a if they are moving around the chamber. In an alternate embodiment, the projector system could be arranged in a different configuration, such as a 2×2 array having four projectors, for example.

Data and electrical cables 48, 50 are provided within the cavity 24. This conceals them and avoids creating a trip hazard for users. The cables 48, 50 connect the projectors 46 and the computer system 36 together, transferring data and power respectively. The cables 48, 50 also connect various parts of the computer system 36 together. In an alternate embodiment, the cables could be affixed to the inner surface(s) of the housing using small clamps, for example.

The computer 38 relays images to the projectors 46 via the image fusion processor 40. The image fusion processor 40 processes the images from the computer 38 and directs different parts (or components) of the images to the different projectors 46. Each projector 46 therefore projects image components onto the screen 20a. Each image component is substantially aligned with its adjacent image component(s) on the screen 20a to form a composite image. For example, the image may be separated into foreground, mid-ground and background components, and the image fusion processor 40 can combine these and distribute data accordingly between the projectors to generate a coherent image on the screen 20a.

Four wheels 52 are attached to the base of the housing 12 (three of which are shown in FIG. 1A). Each wheel 52 is omnidirectional. Two of the wheels 52 are mounted at the bottom of opposite ends of the rear wall 20. The other two wheels 52 are mounted beneath the casing 28 and the drawers 34 respectively. The wheels 52 provide a stable platform on which to move the immersive all-in-one PC system 10. Each wheel 52 is fitted with a brake to stop the immersive all-in-one PC system inadvertently rolling (or being rolled) to another position.

In use, a user can enter the chamber through the front archway 22, and then activate the computer system 36 and projectors 46. The projectors 46 illuminate the screen 20a with images provided by the computer system 36, such as a video feed when playing a boxing computer game, for example. The screen 20a is substantially larger than average conventional TV screens and monitors, and thus provides a highly immersive experience for the person or people using the immersive all-in-one PC system 10, with boxing opponents and a boxing ring of realistic size, in the present example. If the immersive all-in-one PC system 10 is being used in a temporary position within a room, it can be moved out of the way by disengaging the brakes on its wheels 52 and pushing/pulling the immersive all-in-one PC system 10 to another position. The brakes are then re-engaged to secure the immersive all-in-one PC system 10 in place.

In some variations of the first embodiment, a second screen is provided. The second screen is flexible and mounted on a reel to enable it to be rolled up for storage. The second screen is mounted to the top of the chamber, spaced from the original screen 20a, and can be pulled down for use (unrolling it). The second screen is made from plastic or fabrics, and is substantially translucent (or may be substantially transparent) to allow light to also reflect from the original screen 20a. This allows separate foreground and background regions to be viewed, enhancing the apparent realism and depth of the images. In other words, the viewer is presented with motion parallax cues to give the illusion of a three-dimensional scene. Alternatively or additionally, the second screen may display a stereoscopic or an auto-stereoscopic three-dimensional image using known techniques which will be familiar to the skilled person.

Figure 2:
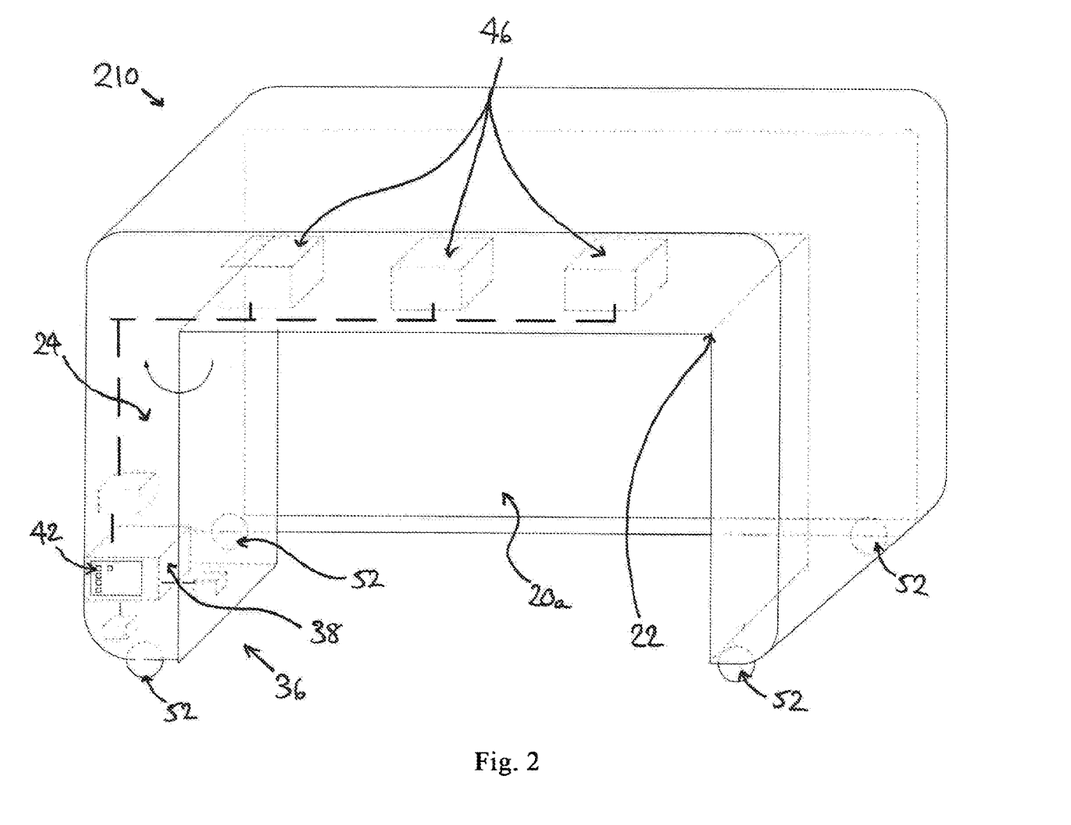
FIG. 2 shows a front perspective view of a second embodiment of an immersive all-in-one PC system of the present invention.

With reference to FIG. 2, a second embodiment of an immersive all-in-one PC system is indicated generally at 210. This immersive all-in-one PC system 210 includes similar features to the first immersive all-in-one PC system 10, and these are referred to using the same reference numerals.

Drawers and a casing are not included in this embodiment. Instead, the computer system 36 is contained in the cavity 24 within the sidewall 14. Apertures (not shown) are provided at suitable positions in the housing 12 for similar reasons to the first embodiment. The archway 22 in the immersive all-in-one PC system 210 effectively has a wider entrance due to the lack of casing and drawers, and the chamber is also larger as a consequence. The omnidirectional wheels 52 provided beneath the casing and drawers in the first embodiment are instead provided beneath the sidewalls 14, 16, at opposite ends of the archway 22.

Referring next to FIGS. 3A to 3E, a third embodiment of an immersive all-in-one PC system is indicated generally at 310. The immersive all-in-one PC system 310 includes a housing 312 with an outer wall 326, an inner wall 324, and a cavity 328 between the outer and inner walls 326, 324. The outer and inner walls 326, 324 include two sidewalls 314, 316, a top wall 318, and a rear wall 320 which are integrally formed. The sidewalls 314, 316 and top wall 318 form a front entranceway 322 opposite the rear wall 320, for a person to enter the immersive all-in-one PC system 310. The housing 312 is approximately semi-cylindrical in shape. The immersive all-in-one PC system 310 is used in a similar manner to the first embodiment.

The inner surface of the rear wall 320 is a curved screen 320a. The screen 320a fills the field of view of an observer by substantially at least 180°, when the screen 320a is seen from a viewing region within the chamber. The person 100 is shown standing at the edge of the chamber (FIG. 3A) and outside the chamber (FIG. 3D) for reference.

Figure 3A:
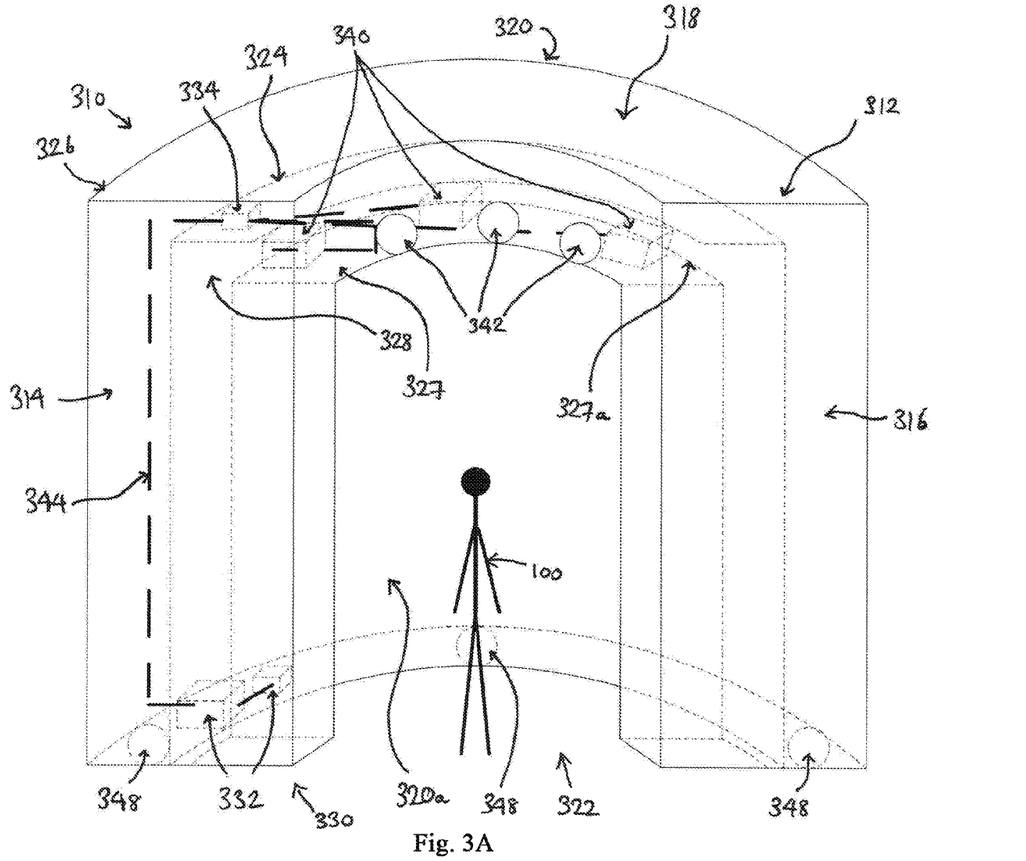
FIG. 3A shows a front perspective view of a third embodiment of an immersive all-in-one PC system of the present invention.
Figure 3B:
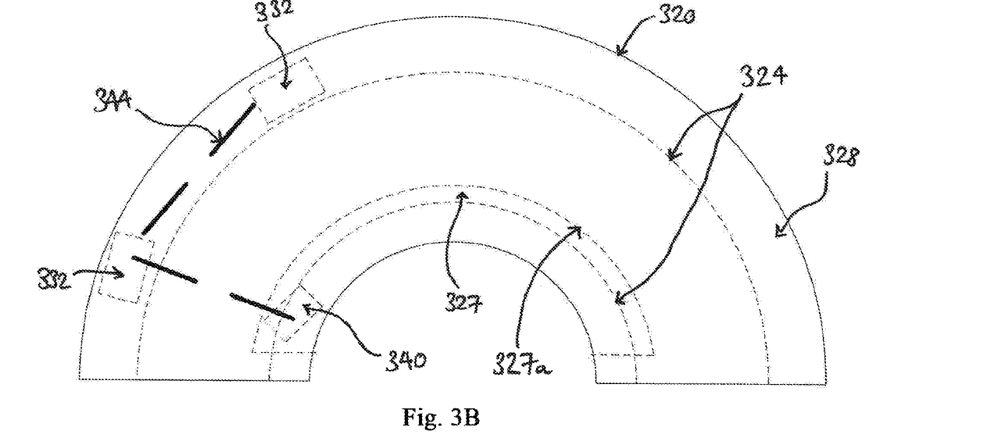
FIG. 3B shows a plan view of the immersive all-in-one PC system of FIG. 3A.
Figure 3C:
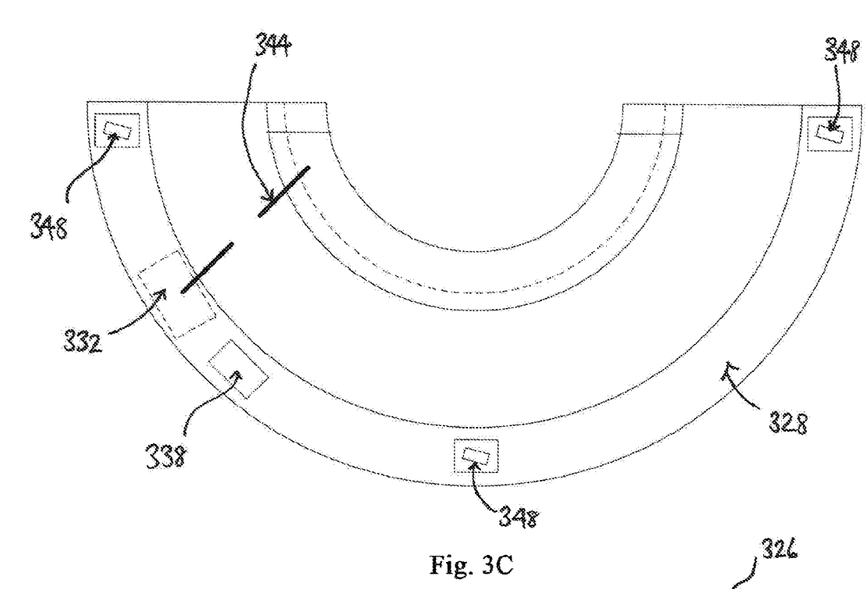
FIG. 3C shows an underside view of the immersive all-in-one PC system of FIG. 3A.
Figure 3D:
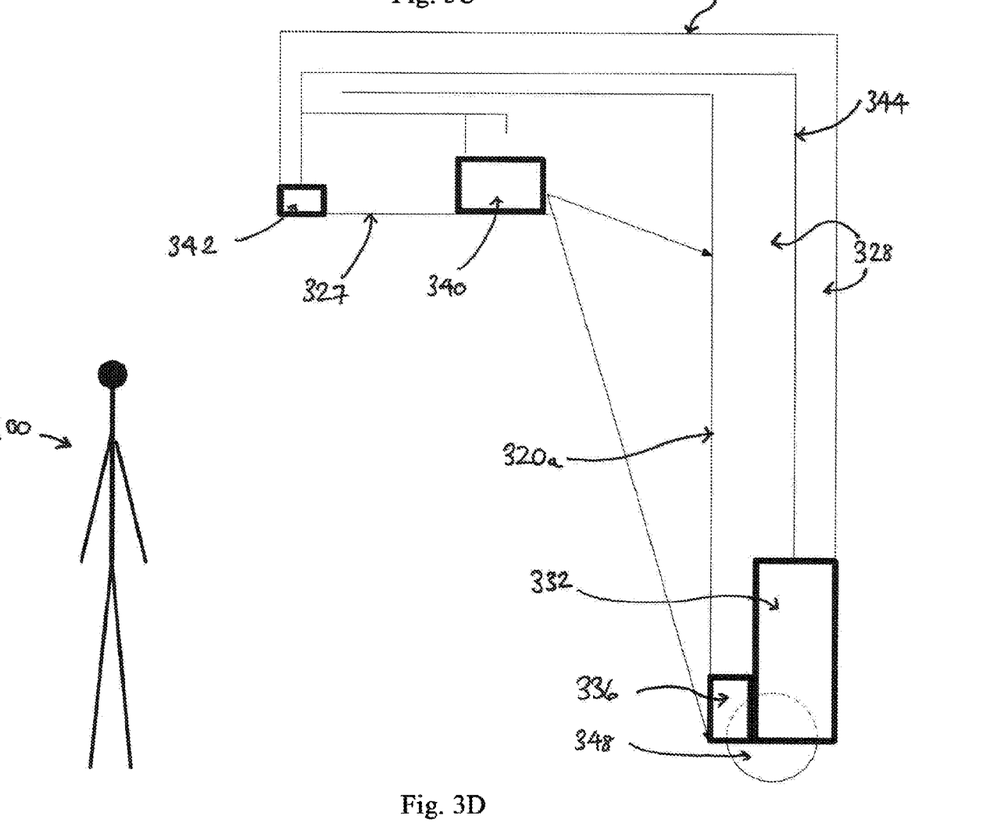
FIG. 3D shows a cross-sectional side view of the immersive all-in-one PC system of FIG. 3A.
Figure 3E:
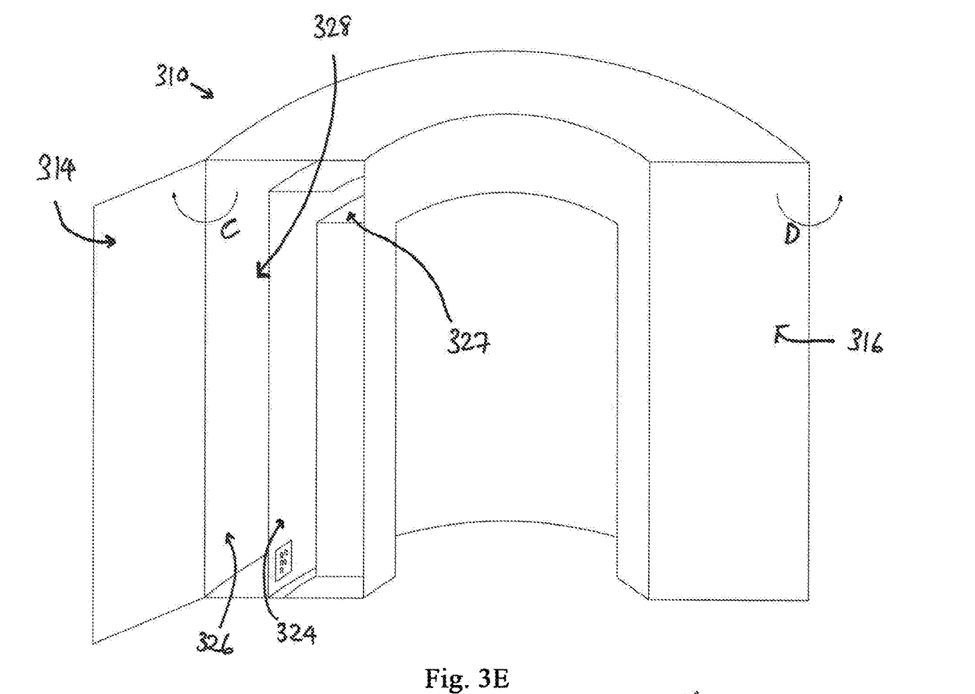
FIG. 3E shows a front perspective view of the immersive all-in-one PC system of FIG. 3A, demonstrating the use of access panels.

A shelf 327 is disposed within the housing 312, depending from the outer wall 326 and extending into the chamber. The shelf 327 is shown in FIGS. 3D and 3E. The shelf 327 extends behind the entranceway 322 towards the screen 320a. The shelf 327 is substantially shaped as a curved arc. The shelf 327 includes a distal edge 327a at the furthest extent of the shelf 327 from the entranceway.

In FIG. 3E, the sidewalls 314, 316 function as access panels that can be opened to access the cavity 328, as indicated by the arrows C, D. The rear wall 320 includes panels (not shown) that can also be opened in a similar manner for access, without substantially altering the screen 320a.

The cavity 328 contains a computer system 330 that includes a computer 332, an image fusion processor 334, and a speaker system. The computer 332 is disposed towards a lower end of the inner wall 324, with the speaker system located adjacent the computer 332. The speaker system includes speakers 336 spaced around the inner wall 324. An aperture 338 is provided through a lower face of the housing 312 to improve air circulation around the computer system 330.

A projector system with three projectors 340 is mounted on the shelf 327 for projecting images onto the curved screen 320a. The projectors 340 are radially spaced apart around the top of the shelf 327. One of the projectors 340 is central on the shelf 327 and faces towards the screen 320a opposite the entranceway 322. The other projectors 340 are spaced substantially equidistantly to either side of the central projector 340. The projectors 340 in this embodiment face normal to the screen 320a. The projectors 340 are substantially aligned with the distal edge 327a of the shelf 327. Collectively, the projectors 340 can project images to cover the full screen 320a. The projectors 340 face outwardly along diverging lines, pointing away from the entranceway 322 towards the rear wall 320.

Each projector 340 is controlled by the computer 332 and projects a component image which substantially aligns with adjacent component image(s) on the screen 320a to provide a panoramic view. This is achieved via the image fusion processor 334 in a similar manner to that described for the first embodiment. Aligned images can include some overlap. The computer 332 synchronises the projectors 340 and the speakers 336 so that the projected images and sound are experienced coherently by a person using the immersive all-in-one PC system 310.

A camera system is mounted to the shelf 327. The camera system has cameras for two different purposes. The first purpose is to record video, and the second purpose is to capture motion. Examples of systems that use cameras to capture motion include the KINECT®, Intel® RealSense®, and Leap Motion®.

Errors can accumulate over time during usage of the motion capture camera. For example, the motion capture camera may be blocked from capturing the motion of the user by an obstacle within the immersive all-in-one PC system, by interference from light originating from sources other than the projectors, or as a consequence of the user's orientation or position in the chamber, preventing accurate tracking. The video cameras are used to correct errors from the motion capture camera, by comparing the images captured and determining the user's actual position and motion.

In some embodiments, cameras which are purposed for motion capture are linked with (i.e. work in tandem with) an inertial motion unit. Manufacturers such as Yei, Sixense, Invensense, or Notiom provide suitable motion capture technology. The inertial motion unit may be disposed in a smart wearable input device, for example. This allows accurate tracking of hand movement, amongst others. It also avoids the need for multiple input devices, e.g. a Kinect® and a keyboard, since the user can input commands to the wearable device instead.

The camera system includes three cameras 342 provided adjacent to the projectors 340. In this embodiment, one camera is used to track the user's motion, and two cameras are used to record video. As seen in FIGS. 3A and 3D, the cameras 340 are spaced apart around the entranceway 322 at substantially the same level as the shelf 327. Each camera 342 can capture events that occur substantially within the chamber. The cameras 342 can have overlapping fields of view in order to view a person from different angles. Data and electrical cables 344 are disposed within the cavity 328 and connect the projectors 340, cameras 342 and various parts of the computer system 330 to each other.

The computer system 330 processes recordings from the cameras 342 to identify actions or gestures, for example, made by the person. If a specific action/gesture is detected, the computer system 330 initiates a corresponding pre-programmed response. For example, where the person moves around within the chamber, the computer system 330 alters the projected images (substantially in real time) to imitate a corresponding change of perspective. The camera system thus functions as an optical feedback system, improving the degree of realism experienced by a person using the immersive all-in-one PC system 310.

Three omnidirectional wheels 348 with brakes are attached to the base of the housing 312. Two of the wheels 348 are mounted at the bottom of opposite ends of the rear wall 320, with the third wheel 348 mounted below the rear wall 320 approximately midway between the other wheel 348 for stability.

Referring now to FIGS. 4A to 4D, a fourth embodiment of an immersive all-in-one PC system is indicated generally at 410. The immersive all-in-one PC system 410 includes a housing 412 having an outer wall 414, a top wall 416 and an aperture 416*a* through the top wall 416 for airflow. The outer wall 414 is approximately cylindrical in shape. The housing 412 also includes an inner wall 418 that outlines a chamber within the housing 412. A cavity 420 is provided between the inner and outer walls 418, 414. The inner wall 418 surrounds a person by 360° when stood within the housing (see FIG. 4A). The outer wall 414 includes doors 414*a*, 414*b* moveable in the directions of arrows E and F to allow entry into and exit from the housing 412. In some embodiments, the housing 412 is assembled from two substantially semi-cylindrical halves, for ease of delivery.

Figure 4A:
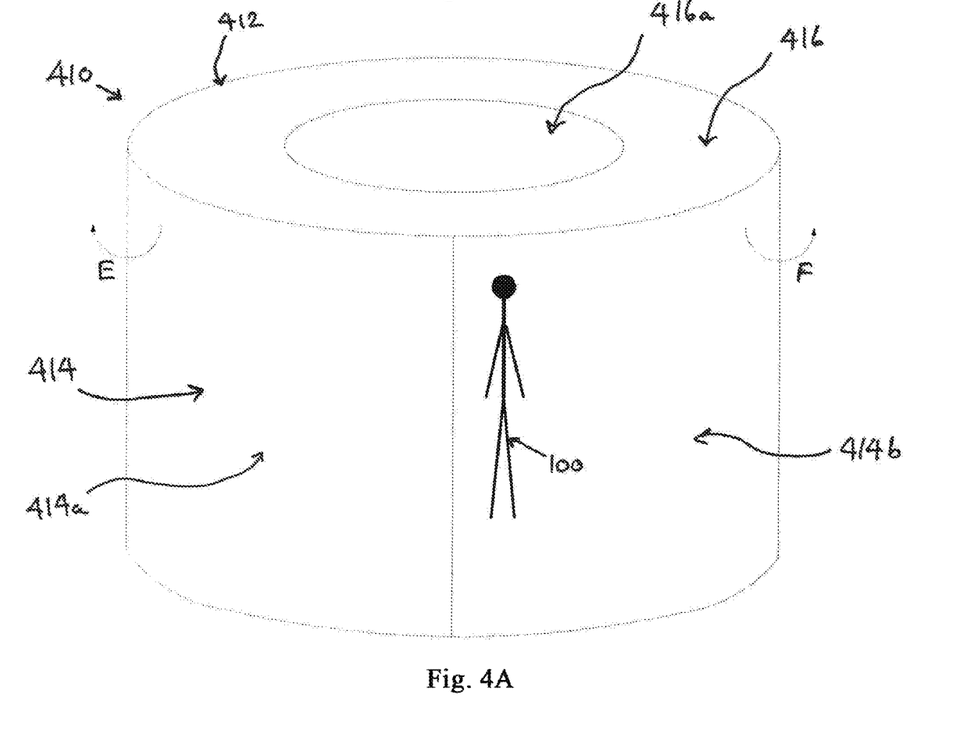
FIG. 4A shows a front perspective view of a fourth embodiment of an immersive all-in-one PC system.

The immersive all-in-one PC system 410 includes a computer system, projectors 424 and cameras 426. The inner wall 418 includes a screen 418*a* for displaying images from the projectors 424. The screen 418*a* is set far enough back from the top wall aperture 416*a* that ambient light does not substantially reduce the clarity of projected images on the screen 418*a*. The cameras 426 form a panoramic camera array. The cameras 426 are similar to those described for the third embodiment, with two video cameras per motion capture camera.

The projectors 424 and cameras 426 are disposed on a support wall 432 (similar to the shelf of the third embodiment). In alternate embodiments, the projectors 424 may be securely fixed to the support wall 432 in predetermined positions, or hung on the inner wall 418.

Figure 4B:
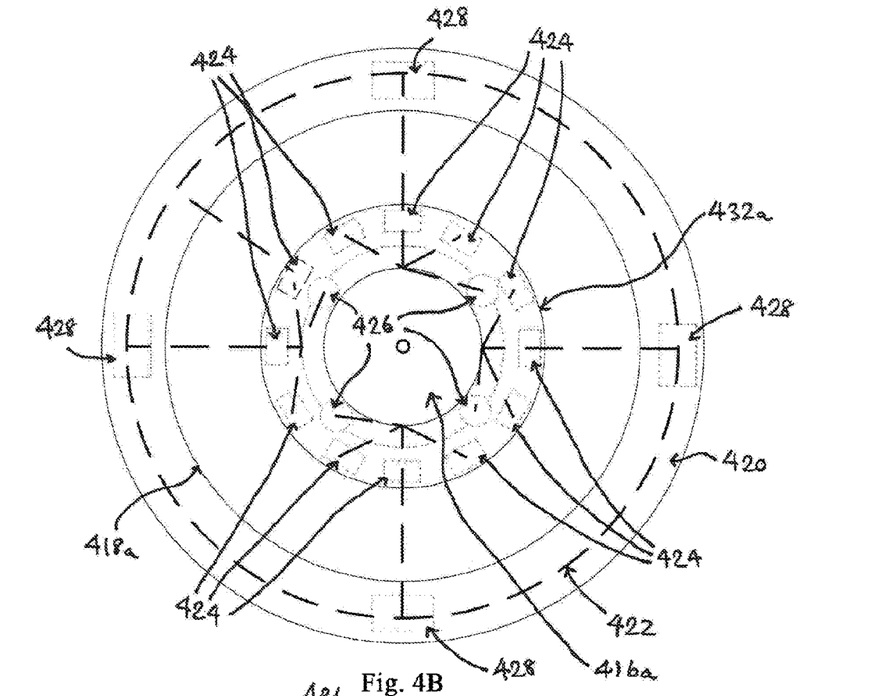
FIG. 4B shows a plan view of the immersive all-in-one PC system of FIG. 4A.
Figure 4C:
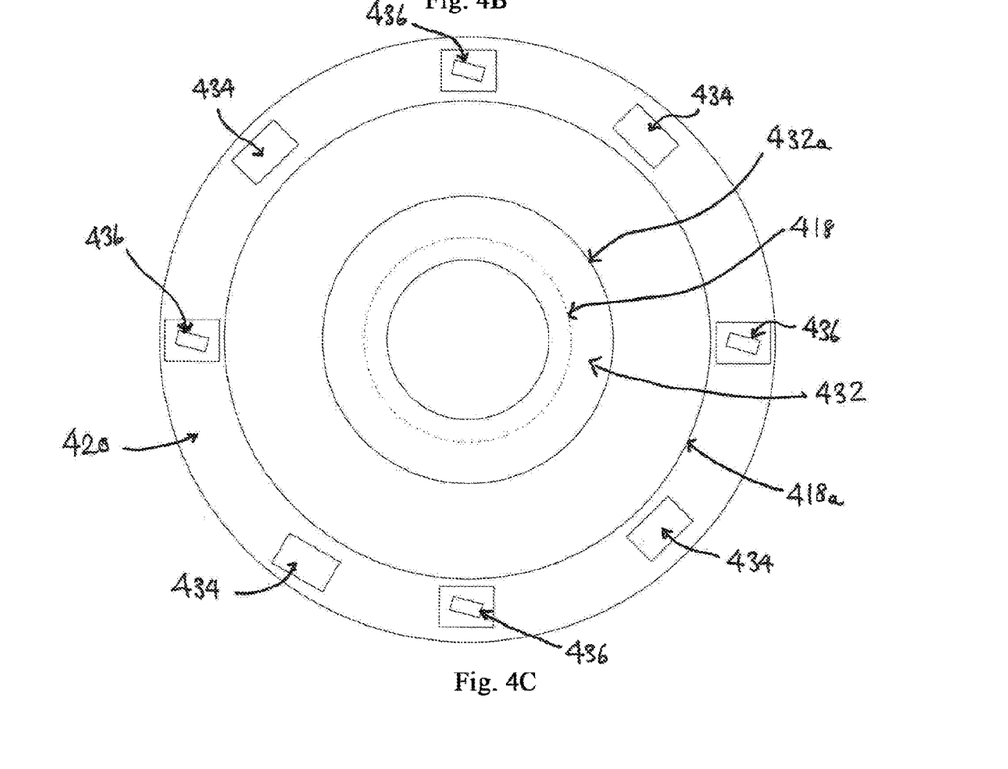
FIG. 4C shows an underside view of the immersive all-in-one PC system of FIG. 4A.
Figure 4D:
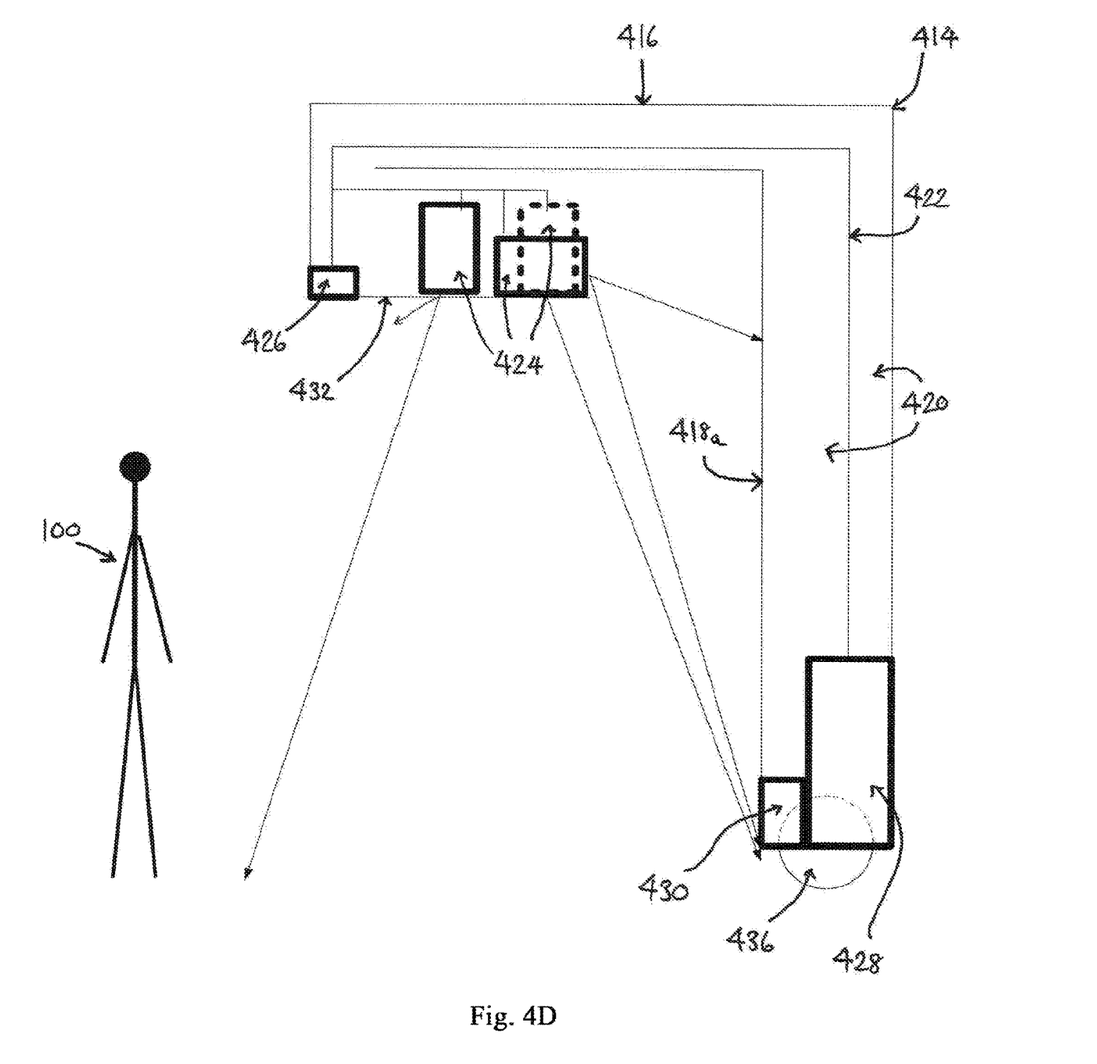
FIG. 4D is a cross-sectional side view showing one half of the immersive all-in-one PC system of FIG. 4A.

The support wall 432 is shaped substantially like an annulus. The support wall 432 depends substantially vertically from an inner curved edge of the top of the outer wall 414, and extends substantially horizontally outwards therefrom into the chamber to form a shelf. In other words, the support wall 432 is a cantilever support facing towards the inner wall 418. The projectors 424 are spaced equally around the support wall 432 at increments of substantially around 30°. The cameras 426 are provided on the support wall 432 substantially every 90°.

The support wall 432 includes a circumferential edge 432*a*. The edge 432*a* is the furthest extent of the wall 432 from the centre immersive all-in-one PC system 410. Some of the projectors 424 are arranged on the support wall 432 substantially horizontally to project images onto the inner wall 418. These projectors 424 face across the edge 432*a* from an inner region of the housing 412 to an outer region of the housing 412, i.e. from support wall 432 towards the outer wall 414.

Other projectors 424 are arranged on the support wall 432 substantially vertically, facing through the support wall 432 to project images onto the ground within the housing 412. Apertures (not shown) through the support wall 432 are provided and aligned with the vertically-arranged projectors 424 to facilitate this without blocking any substantial portion of the projected images. In alternate embodiments, the support wall 432 may include substantially transparent or translucent sections to achieve the same thing.

In this embodiment, there are four computers 428 within the cavity 420. Each computer 428 is connected to and controls three projectors 424 and a camera 426, i.e. there are twelve projectors 424 and four cameras 426 in total. Data and power cables 422 within the cavity 420 link each computer 428 to its projectors 424 and camera 426, and also link the different computers 428 to each other.

The computer system includes a speaker 430. The speaker 430 extends circumferentially around the foot of the inner wall 418. The computers 428 control the speaker 430 so that sound originates from a region of the inner wall 418 where the corresponding image is visible. In other words, if a given element of an image moves around the screen 418*a* relative to its previous position, the speaker 430 is coordinated to emit sounds that are synchronised with that element (if the sound is intended to be associated with that element). For example, in the case of playing a boxing computer game, verbal instructions from a referee would appear to emanate from the region of the inner wall 418 having the image of the referee.

Four openings 434 are provided at the base of the housing 412, distributed at 90o intervals for each computer 428. Four omnidirectional wheels 436 are also attached to the base of the housing 412, functioning as described for the other embodiments. The wheels 436 are substantially held within the cavity 420, protruding from the base of the housing 412 to a minimal extent. Hence, the ground clearance of the housing 412 is minimal, and projected images appear to meet the ground almost seamlessly.

In use, the computer system, projectors 424, cameras 426 and speaker 430 are all synchronised with each other so that images projected onto the screen 418a surround the person with a complete panorama, and sounds are emitted in spatial and temporal co-ordination with the images displayed. In other words, the viewer is provided with an unbroken view of the projected image regardless of the direction in which they are facing within the chamber (with the exception of the top wall aperture 416a), and sounds originate from different regions of the chamber to simulate reality.

Referring now to FIGS. 5A to 5E, a fifth embodiment of an immersive all-in-one PC system is indicated generally at 510. This immersive all-in-one PC system 510 includes similar features to the fourth immersive all-in-one PC system 410, referenced using the same numerals for ease of reference.

Figure 5A:
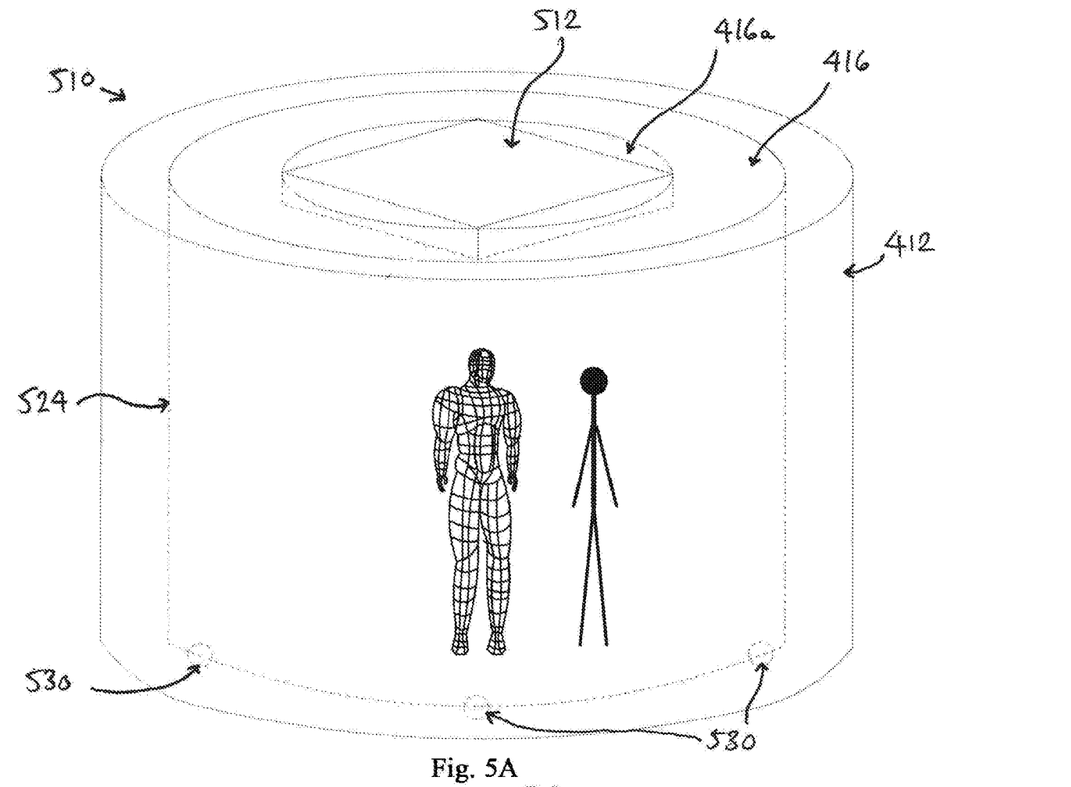
FIG. 5A shows a perspective view of a fifth embodiment of an immersive all-in-one PC system of the present invention.
Figure 5B:
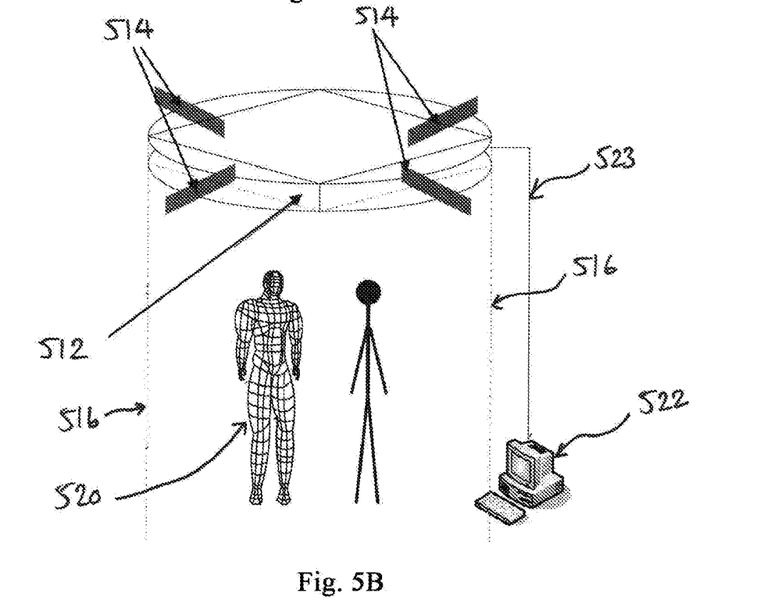
FIG. 5B shows a perspective view of a section of the immersive all-in-one PC system of FIG. 5A.
Figure 5C:
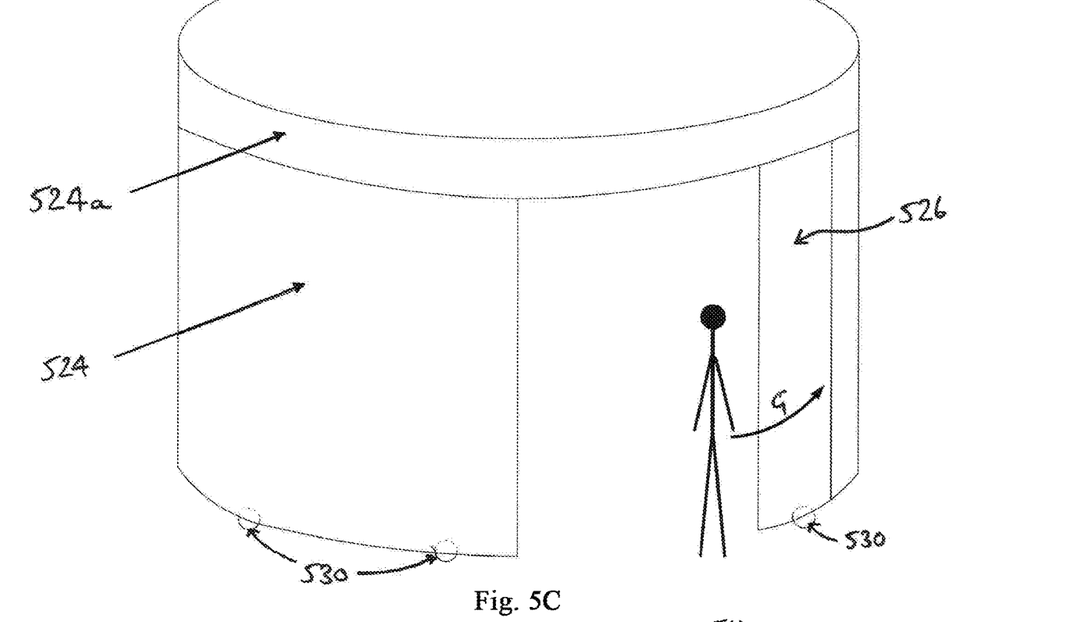
FIG. 5C shows a perspective view of another section of the immersive all-in-one PC system of FIG. 5A.

The immersive all-in-one PC system 510 includes a housing 412, a top wall 416 and aperture 416a, an inner wall 418 and screen 418a, and a cavity 420, amongst others, like the fourth embodiment. In addition to the features of the fourth embodiment, the immersive all-in-one PC system 510 includes a 3D display system 512. The 3D display system 512 is described in detail in the Applicant's granted Patent GB 2517069, the disclosure in which is incorporated herein by reference. In this embodiment, the 3D display system 512 includes projectors that project three-dimensional images into a three-dimensional display volume, with further images being displayed on one or more screens behind the display volume, at least one of which is translucent. This creates a highly immersive virtual reality environment for the user by creating the illusion of a large virtual world within a relatively small physical space.

In the example given in FIGS. 5A to 5D, the 3D display system 512 is disposed within the aperture 416a of the top wall 416. The 3D display system 512 is mounted by four mechanical structures 514. The structures 514 connect to the periphery of the aperture 416a, and are spaced equally around the 3D display system 512. The structures 514 may be a framework of bars, for example, which connects different elements of the immersive all-in-one PC system 510 together and improves the structural integrity of the immersive all-in-one PC system 510.

Figure 5D:
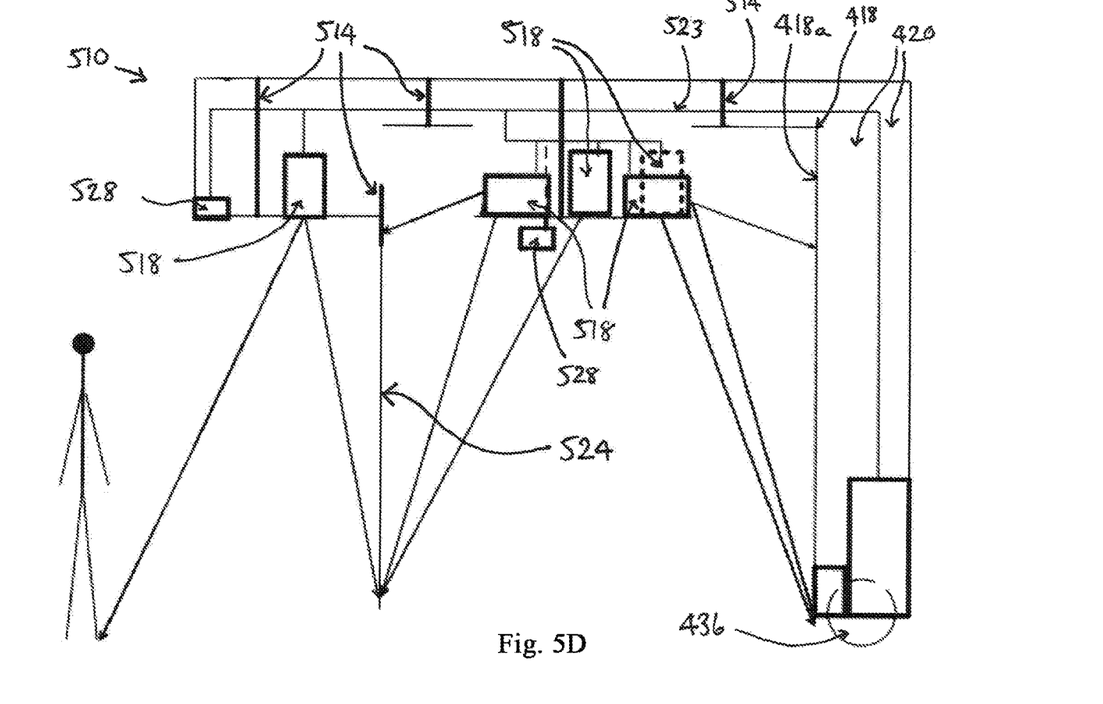
FIG. 5D shows a cross-sectional side view of portions of the immersive all-in-one PC system of FIG. 5A.

The 3D display system 512 includes a cloud of particles (indicated generally by dashed lines at 516) and a projector system 518 (see FIG. 5D). The cloud of particles 516 functions as a screen or display volume. The projector system 518 includes a plurality of projectors. The cloud of particles 516 is illuminated by the projector system 518, displaying a 3D image 520. The cloud of particles may be composed of water and, in such cases, a fog machine and water tank (not shown) may be included within the housing 412 for generating the cloud of particles. A computer system 522 is connected to the projector system 518 to control the images projected. The computer system 522 may be disposed within the cavity 420 as described for previous embodiments. Cables 523 link the computer system to the projector system 518.

The immersive all-in-one PC system includes a secondary housing 524 nested within the housing 412. The housings 412, 524 are connected together by the mechanical structures 514. An upper section 524a of the secondary housing 524 is contained within the cavity 420. The upper section 524a includes wheels and tracks (not shown) to allow the secondary housing 524 to move relative to the outer housing 412. The exterior of the secondary housing 524 is spaced from the inner wall 418.

Another section of the projector system 518 is arranged to project images onto the secondary housing 524, so that it functions as another screen of the immersive all-in-one PC system 510. The secondary housing 524 is substantially transparent. This allows light reflected from surfaces behind the secondary housing (relative to the user) to be seen, i.e. light from the screen 418a of the inner wall 418.

The secondary housing 524 includes a door 526. The door 526 is substantially transparent, like the secondary housing 524. The door 526 is slidable in the direction of arrow G to open the door 526, and back again to close the door 526. Omnidirectional wheels 530 are provided beneath the secondary housing 524 for the same reasons as the other wheels 436. Although the secondary housing 524 is substantially cylindrical in this embodiment, it may be shaped differently in alternate embodiments.

Cameras 528 are connected to the computer system 522 by the cables 523 to monitor the user's position and interaction with the projected image(s). The cameras 528 are similar to those described for the third and fourth embodiments. The feedback provided by the cameras 528 allows the computer system 522 to correspondingly update the images in relation to the user in real time for a more realistic experience. The cameras 528 are positioned in different regions of the immersive all-in-one PC system 510. The array of cameras 528 record and capture motion in the immersive all-in-one PC system 510 from different angles. The cloud of particles and the secondary housing do not obscure any recordings made by cameras facing in the direction of those screens.

In this embodiment, the cameras 528 are provided in two layers (or arrangements). This enables a panorama of the interior of the immersive all-in-one PC system 510 to be recorded. In turn, if system maintenance is required, an engineer can be shown the state of the immersive all-in-one PC system 510 remotely, enabling him to advise the user how to repair or fix the problem without attending the site in person.

The immersive experience is greatly enhanced by having three screens in the immersive all-in-one PC system 510, because the apparent depth of the images (or panorama) projected is increased. This is achieved by projecting background imagery onto the inner wall screen 418a, midground imagery onto the secondary housing 524, and foreground imagery onto the cloud of particles screen 516. This creates a multi-layered effect which more closely replicates depth and perspective compared to a single screen.

The immersive experience is further enhanced by the 3D stereo sound system. In this embodiment, a plurality of speakers are provided in the immersive all-in-one PC system 510. There is a speaker for each projector 518. If an image is shown on the cloud of particles 516 screen, any sounds corresponding to that image will be emitted by the corresponding speaker to imitate the location and intensity of the sound, as though emitted at close proximity. Similarly, if an image is shown on the secondary housing 524, or further away on the inner wall 418, sounds will be emitted by corresponding speakers that give the impression of the sound originating more distantly from the apparent location of the image (which may be at an apparent depth beyond the bounds of the immersive all-in-one PC system 510).

If image transitions between screens are towards, around or away from the user (or a combination thereof), sound will be transferred between speakers accordingly. This improves the apparent realism of whatever person or object is approaching, circling or retreating (or other combination of apparent movement) relative to the user.

In use, a 3D model of a scene is constructed in the computer system 522, along with a co-ordinate system corresponding to the immersive all-in-one PC system 510. The cameras 528 capture the user's motion and allow the computer to synchronise the images within the scene with that motion. The user is assigned a co-ordinate value as a virtual figure to form a reference frame when calculating how to update images relative to the user's motion. The cameras 528 enable the co-ordinates of the virtual figure in the computer system 522 to be kept up-to-date.

Figure 5E:
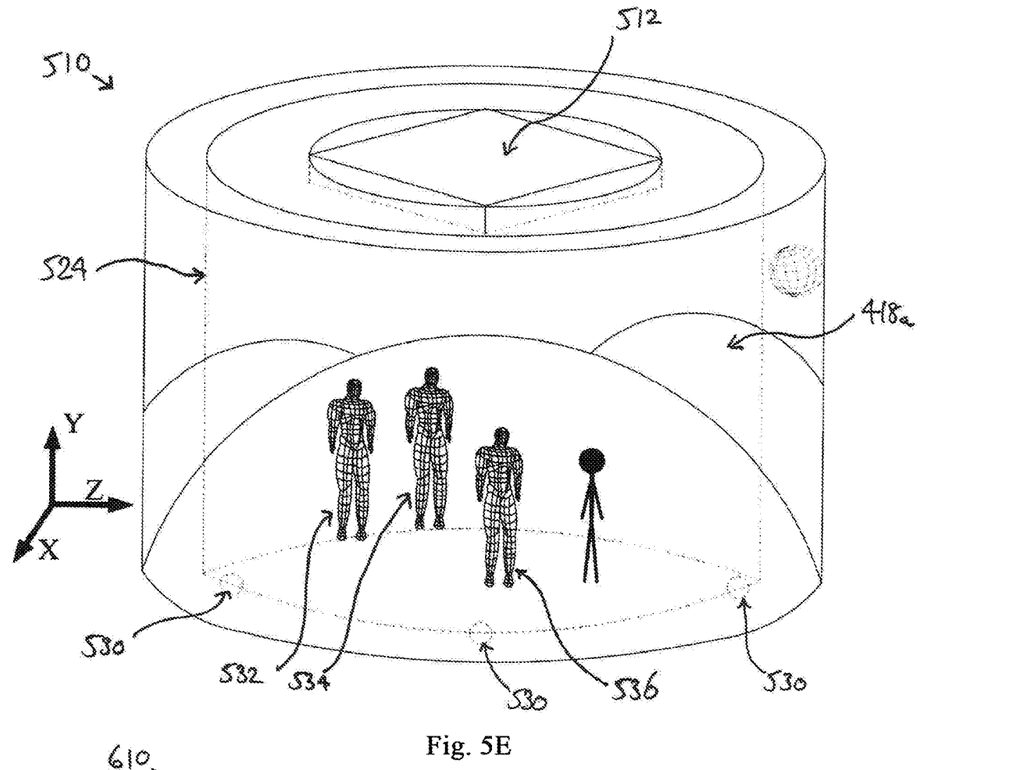
FIG. 5E shows a perspective view of the immersive all-in-one PC system of FIG. 5A in use.

As seen in FIG. 5E, 3D images (or models) 536, 532, 534 are shown at various distances from the user. Each 3D image may be formed from multiple 2D components (or an image grid) and is calculated to have co-ordinates relative to the user. These coordinates correspond to locations in the immersive all-in-one PC system 510 equivalent to the cloud of particles 516 and secondary housing 524, giving a multi-layered effect.

For the 3D image 536 displayed on the cloud of particles 516 in particular, its relative co-ordinates will correspond to the real world distance between the user and the 3D image 536. In other words, there is a certain relationship between the 3D image coordinate value and the real world position of the resulting image. The relative position of the user's virtual figure to the other images affects which images are displayed where in the real word. The other 3D images 532, 534, and images on the screen 418a of the inner wall 418, may need further modification to adjust the perceived position of those features from the user's perspective.

Figure 6:
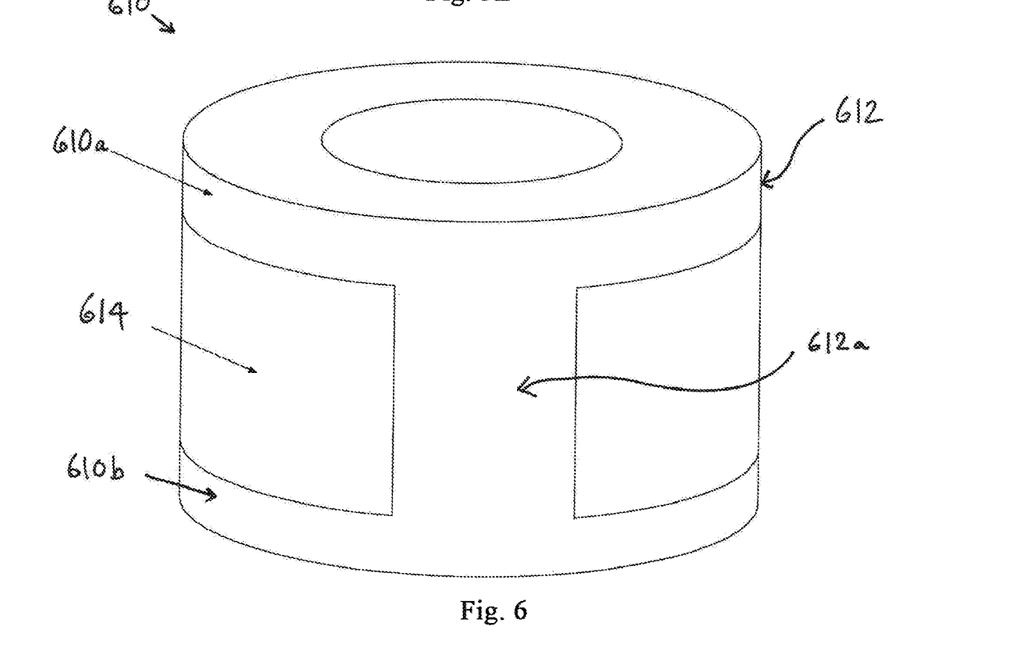
FIG. 6 shows a perspective view of a sixth embodiment of an immersive all-in-one PC system of the present invention.

Referring to FIG. 6, a sixth embodiment of an immersive all-in-one PC system is indicated generally at 610. The features of this embodiment are similar to those of the fourth embodiment or fifth embodiment, with an outer wall 612 defining a substantially cylindrical volume. However, unlike those embodiments, the outer wall 612 is not itself cylindrical in shape. Instead, gaps are provided through the sides of the immersive all-in-one PC system, and the gaps are covered by a flexible screen 614. The screen 614 extends around most of the circumference of the immersive all-in-one PC system 610. The screen 614 divides the immersive all-in-one PC system into upper and lower portions 610a, 610b. As the outer wall 612 can be made from metal, using a flexible screen reduces the overall weight of the immersive all-in-one PC system 610, for ease of delivery.

The flexible screen 614 is inset from the upper and lower parts of the immersive all-in-one PC system 610. The flexible screen 614 forms part of an inner wall (not shown), and functions as the display screen onto which images are projected. Upright portions 612a of the outer wall 612 hold the upper portion 610a securely above the lower portion 610b. Inward facing sections of the upright portions 612a form part of the inner wall with the flexible screen 614. A computer system, projector system and support frames, as described for the fourth or fifth embodiments, are contained within a cavity (not shown) within the outer wall 612.

Although the above embodiment has been described with respect to several embodiments, other embodiments are also envisaged within the scope of the appended claims. Features described with respect to one of the embodiments may be provided in combination with features from one or more alternate embodiments. For example, the first and second embodiments could be curved immersive all-in-one PC systems, or the third embodiment could be an immersive all-in-one PC system with a relatively planar shape.

The housing may be constructed from metal and/or recycled materials, for example. The inner wall may be completely metallic, rather than just having a surface coating of metal. The cavity between the inner and outer walls may be of any shape provided that it lies between the inner and outer walls. The housing may include a base wall as a floor adjacent to the ground, to enable seamless transitions of images from the inner wall to the ground. The computer system may include various devices including but not limited to television hardware and gaming consoles (and associated hardware), e.g. an XBOX® and/or a KINECT®. A VR camera may be used instead of a panoramic camera array. There may be different numbers of motion capture cameras and video recording cameras used in combination, e.g. one-to-one. Software installed on the computer(s) may be used in place of an image fusion processor. Other peripherals, such as a running machine, can also be integrated into the immersive all-in-one PC system. Any number of computers, projectors, cameras, apertures, and wheels may be provided in any combination in various relative positions in a given embodiment. Combined data and electrical cables may be used. The computer system may be remotely controlled via smartphone or tablet, or another device.

The embodiments described above are provided by way of example only, and various changes and modifications will be apparent to persons skilled in the art without departing from the scope of the present invention as defined by the appended claims.

The invention claimed is:

1. An immersive all-in-one PC system, comprising:
    a housing comprising an outer wall, an inner wall connected to the outer wall, and a cavity between the outer and inner walls, wherein the inner wall has one or more surfaces defining a chamber within the housing, and the housing further comprises at least one entranceway bridging the outer and inner walls for a person to enter and exit the chamber;
    a projector system disposed internally within confines of the outer wall and configured to project images onto a chamber side of the inner wall for providing an immersive viewing experience to a person situated inside the chamber; and
    a computer system disposed at least partially within the cavity, the computer system being connected to the projector system for controlling the projected images;
    wherein the outer wall is opaque and positioned to prevent ambient light from interfering with the images displayed within the chamber, and the wall includes a top wall positioned in overhead relation to the chamber side of the inner wall on which the images are projected.

2. An immersive all-in-one PC system as claimed in claim 1, wherein the inner wall comprises a support structure in an upper region of the housing, and the projector system is supported by the support structure.

3. An immersive all-in-one PC system as claimed in claim 2, wherein the support structure is a shelf, and the projector system is arranged on the shelf to project images outwardly therefrom.

4. An immersive all-in-one PC system as claimed in claim 3, wherein the inner wall comprises a substantially vertical screen, and the projector system is configured to project images from the shelf to the screen.

5. An immersive all-in-one PC system as claimed in claim 4, wherein at least one additional screen is provided within the chamber, interposed between the substantially vertical screen and the projector system.

6. An immersive all-in-one PC system as claimed in claim 3, wherein the shelf comprises a distal edge, and the projector system at least faces over the distal edge for projecting images onto the screen.

7. An immersive all-in-one PC system as claimed in claim 6, wherein a part of the projector system faces the shelf, and the shelf is adapted to allow substantial passage of the projected images therethrough, enabling the projector system to project images onto the ground within the housing.

8. An immersive all-in-one PC system as claimed in claim 1, wherein the projector system points from an inner region of the housing towards an outer region of the housing.

9. An immersive all-in-one PC system as claimed in claim 1, wherein the projector system is at least partially mounted within the cavity.

10. An immersive all-in-one PC system as claimed in claim 1, wherein support wheels are provided underneath the housing.

11. An immersive all-in-one PC system as claimed in claim 10, wherein the support wheels are omnidirectional.

12. An immersive all-in-one PC system as claimed in claim 1, wherein the one or more surfaces of the inner wall comprise at least one metallic surface.

13. An immersive all-in-one PC system as claimed in claim 1, wherein the one or more surfaces of the inner wall comprise at least one curved surface.

14. An immersive all-in-one PC system as claimed in claim 1, wherein the housing extends around a viewing region of the chamber by substantially at least 180°.

15. An immersive all-in-one PC system as claimed in claim 14, wherein the housing extends around the viewing region of the chamber by substantially 360°.

16. An immersive all-in-one PC system as claimed in claim 1, wherein the projector system comprises multiple projectors, and the computer system comprises an image fusion processor connected to the projectors, the processor being configured to enable the projectors to project image components which are combined on the inner wall.

17. An immersive all-in-one PC system as claimed in claim 1, wherein the housing comprises a camera system connected to the computer system for tracking a person within the chamber.

18. An immersive all-in-one PC system as claimed in claim 17, wherein the computer system adjusts the projected images to substantially correspond to a position of a person within the chamber captured by the camera system.

19. An immersive all-in-one PC system as claimed in claim 17 wherein the computer system is controllable via specific motions captured by the camera system.

20. An immersive all-in-one PC system as claimed in claim 1, wherein the housing comprises a speaker system connected to the computer system, the speaker system being adapted to selectively emit sound from one or more directions corresponding to at least one location of one or more of the projected images displayed on the inner wall.

* * * * *